May 7, 1968 G. L. BIEHN ET AL 3,381,489
LOW AMBIENT CONTROLS FOR HEAT PUMPS
Filed Feb. 24, 1967
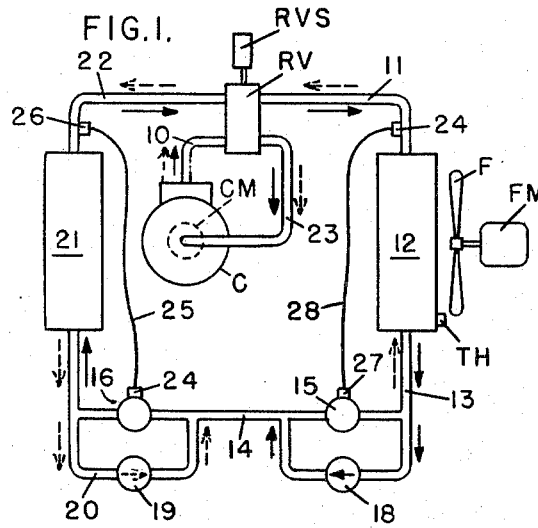
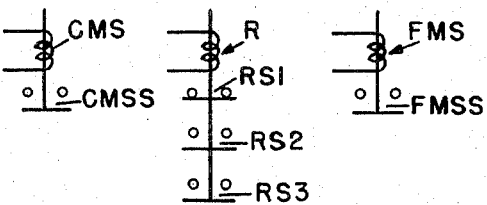
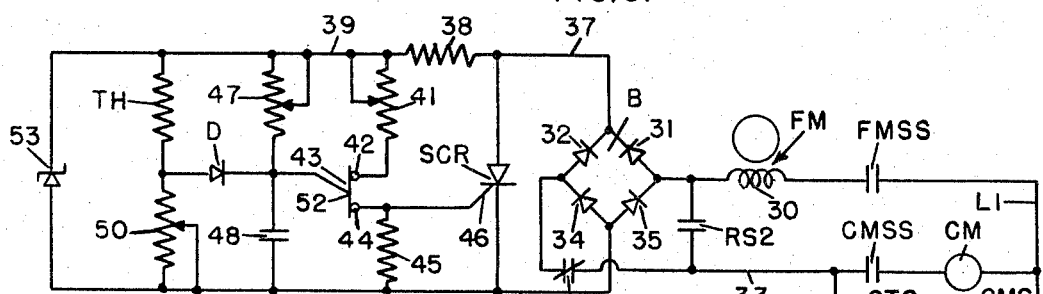
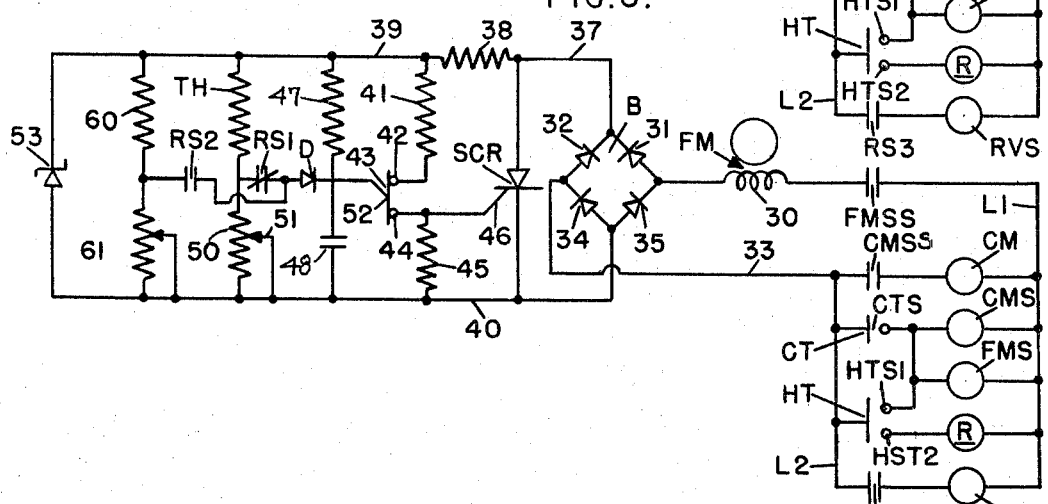
INVENTORS:
GERALD L. BIEHN,
ROBERT T. PALMER,
BY Robert J. Palmer ATTORNEY

United States Patent Office 3,381,489
Patented May 7, 1968

3,381,489
LOW AMBIENT CONTROLS FOR HEAT PUMPS
Gerald L. Biehn, Staunton, Va., and Robert T. Palmer, Sharon, Mass., assignors to Westinghouse Electric Corporation, Pittsburgh, Pa., a corporation of Pennsylvania
Filed Feb. 24, 1967, Ser. No. 618,521
9 Claims. (Cl. 62—160)

ABSTRACT OF THE DISCLOSURE

A thermistor responsive to the temperature of the outdoor coil of a heat pump adjusts a solid-state, speed control circuit to slow down the motor of the fan of the outdoor coil during cooling operation for increasing the head pressure when the outdoor temperature is so low that the operating expansion valve can not operate properly. When the heat pump is reversed for heating operation, the fan motor of the outdoor coil is caused to operate at its maximum speed regardless of temperature variations.

Background of the invention

The field of the invention is heat pumps having outdoor coils which are operated as condensers during cooling operation, and as evaporators during heating operation. At low outdoor temperatures during cooling operation, the pressure of the refrigerant within the outdoor coils may be insufficient to properly operate the associated expansion means. The U.S. Patents Nos. 2,705,404, 2,952,991 and 3,196,629 disclose so-called "Low Ambient Controls" for non-reversible refrigeration systems which use condenser temperature sensing means to slow down the motors of the fans of the condensers for causing the pressure within the condensers to increase. Such controls will operate properly with a heat pump when the outdoor coil of the latter is operating as a condenser coil, but will not operate properly when the outdoor coil is operating as an evaporator coil.

Summary of the invention

In one embodiment of this invention, a thermistor in heat exchange contact with a surface of an outdoor coil of a heat pump is connected in a solid-state, speed control circuit to slow down the motor of the fan of the outdoor coil when the latter is operating as a condenser coil during cooling operation. When the associated heat control thermostat calls for heating, it energizes a relay which closes a switch to energize the solenoid of the reversal valve of the heat pump to reverse the flow of refrigerant so that the outdoor coil operates as an evaporator coil. At the same time, the relay opens a switch which disconnects the solid-state circuit from the electric power source, and closes another switch which connects the fan motor of the outdoor coil directly to the power source so that it operates at maximum speed throughout heating operation.

In another embodiment of this invention, the relay when energized, instead of disconnecting the solid-state circuit from the power source, and connecting the fan motor directly to the power source, disconnects the thermistor from the solid state circuit, and connects in its place a fixed resistor having such a value that it causes the solid-state circuit to operate the fan motor at maximum speed throughout heating operation.

Description of the drawings

FIG. 1 is a diagrammatic view of a heat pump embodying this invention;

FIG. 2 is a diagrammatic view of the compressor motor starter of the heat pump;

FIG. 3 is a diagrammatic view of the control relay of the heat pump;

FIG. 4 is a diagrammatic view of the starter of the motor of the outdoor coil fan of the heat pump;

FIG. 5 is a circuit schematic showing the solid-state speed control circuit of the heat pump, and the other electrical components of the heat pump, and FIG. 6 is a modification of FIG. 5.

Description of the preferred embodiment of the invention

Referring first to FIG. 1, a hermetic refrigerant compressor C, having an enclosed, electric driving motor CM, is connected by discharge gas tube 10 to a conventional reversal valve RV, adjustable by a solenoid RVS. The valve RV is connected by tube 11 to one end of outdoor coil 12, the other end of which is connected by tube 13 to one end of tube 14 which contains thermostatic expansion valves 15 and 16. The valve 15 is shunted by a check-valve 18 and the valve 16 is shunted by a check-valve 19. The other end of the tube 14 is connected by tube 20 to one end of indoor coil 21. The other end of the coil 21 is connected by tube 22 to the valve RV. The latter is connected by suction gas tube 23 to the suction side of the compressor C.

The solenoid RVS, when deenergized, positions the reversal valve RV to its cooling position, and when energized, positions the valve RV to its heating position.

Fan F driven by an AC motor FM, is provided for moving outdoor air over the surface of the outdoor coil 12. The indoor coil 21 would also have a motor-driven fan, but since the latter is not involved in the control system of this invention, it is not shown.

The expansion valve 16 has a diaphragm chamber 24 connected by capillary tube 25 to thermal bulb 26 in heat exchange contact with the tube 22, and responds to superheat of the gas in the tube 22 when the coil 21 is operating as an evaporator coil. The expansion valve 15 has a diaphragm chamber 27 connected by a capillary tube 28 to a thermal bulb 29 in heat exchange contact with the tube 11, and responds to superheat of the gas in the tube 11 when the coil 12 is operating as an evaporator coil.

A NTC (negative coefficient of resistance) thermistor TH is in heat exchange contact with a surface of the coil 12.

Referring now to FIGS. 2, 3 and 4, starter CMS of the compressor motor CM has a switch CMSS which closes when the starter CMS is energized; relay R has a normally closed switch RS1 which opens, and has normally open switches RS2 and RS3 which close, when the relay R is energized; and starter FMS respectively, of the fan motor FM has a switch FMSS which closes when the starter FMS is energized.

Referring now to FIG. 5, stator winding 30 of the fan motor FM is connected through the switch FMSS of the starter FMS to AC supply line L1, and in series with diode 31, silicon controlled rectifier SCR, diode 32, the switch RS1 of the relay R, and wire 33 to AC supply line L2. The junction of the winding 30 and the diode 31 is connected through the switch RS2 when closed, to the wire 33. The diodes 31 and 32 are connected with diodes 34 and 35 in a full-wave, rectifier bridge B. The junction of the diodes 31 and 32 has a positive polarity, and is connected to positive wire 37. The junction of the diodes 34 and 35 has a negative polarity, and is connected to negative wire 40. The anode of the rectifier SCR is connected to the wire 37, and its cathode is connected to the wire 40. The wire 37 is connected through resistor 38 to wire 39 which is connected through adjustable resistor 41 to base terminal 42 of unijunction transistor 43, the other base terminal 44 of which is connected through resistor 45 to the wire 40, and to gate 46 of the rectifier SCR. The wire 39 is connected to one end of adjustable resistor 47, the other end of which is connected through capacitor 48 to the wire 40. One end of the thermistor TH is connected to the wire 39, and its other end is connected through adjustable resistor 50 to the wire 40. The junction of the thermistor TH and the resistor 50 is connected through diode D to the junction of the resistor 47 and the capacitor 48, and to control electrode 52 of the transistor 43. A Zener diode 53 is connected to the wires 39 and 40 and clamps the voltage therebetween to a fixed value.

The resistor 50 is adjustable to control the operating point of the thermistor TH, and the resistors 41 and 47 are adjustable to control the range of speed of the motor FM.

The solid-state circuit of FIG. 5 is generally similar to that disclosed on page 132 of the GE SCR Manual, Third Edition. The silicon controlled rectifier acts as a solid state switch, and controls AC to the motor FM as a function of the phase angle at which it is fired by its gate circuit. When it is fired, it continues to conduct until the voltage at its anode decreases to zero voltage at the end of each half-cycle.

The compressor motor CM is connected through the switch CMSS of its starter CMS to the lines L1 and L2. The starters CMS and FMS are connected in parallel, and are connected through switch CTS of cooling control thermostat CT, and switch HTS1 of heating control thermostat HT to the lines L1 and L2. The relay R is connected through switch HTS2 of the heating control thermostat HT to the lines L1 and L2. The reversal valve solenoid RVS is connected through the switch RS3 of the relay R to the lines L1 and L2.

*Cooling operation of FIGS. 1–5*

The solid-line arrows alongside the tubing of FIG. 1 show the direction of refrigerant flow during cooling operation. When the thermostat CT calls for cooling, it closes its switch CTS which energizes the compressor and fan motor starters CMS and FMS respectively. The latter close their switches CMSS and FMSS respectively, starting the compressor and fan motors CM and FM respectively. The relay R is deenergized at this time through the switch HTS of the heating control thermostat HT being open, so that its switch RS3 is open, deenergizing the reversal valve solenoid RVS so that the reversal valve RV is in its cooling position.

Discharge gas from the compressor C flows through the tube 10, the reversal valve RV, and the tube 11 into the outdoor coil 12 operating as a condenser coil. Refrigerant liquid flows from the coil 12 through the tubes 13 and 14, the check-valve 18, the expansion valve 16, and the tube 20 into the outdoor coil 21 operating as an evaporator coil. The gas leaving the indoor coil 21 flows through the tube 22, the reversal valve RV, and the tube 23 to the suction side of the compressor C.

The pulsating DC voltage supplied from the bridge B through the wire 37, the resistor 38, the wire 39 and the resistor 47 to the control electrode 52 of the transistor 43 is insufficient to cause the latter to conduct. The latter conducts during each half-cycle when additional positive voltage is supplied from the junction of the thermistor TH and the resistor 50, through the diode D to the capacitor 48 and the control electrode 52 of the transistor 43. The thermistor TH and the resistor 50 form a voltage divider, the positive voltage at their junction increasing with decreases in the resistance of the thermistor TH and vice versa. The resistance of the thermistor TH increases with decreases in its temperature, and vice versa. The temperature and the resistance of the thermistor vary with the temperature of the refrigerant within the outdoor coil 12, which temperature varies conformably with the pressure of the refrigerant within the coil 12. The components of the solid-state circuit are selected, and the adjustable resistors 47, 41 and 50 are adjusted so that the resistance of the thermistor TH is sufficiently low when the condensing pressure is sufficient to cause the expansion valve 16 to operate properly, to cause the transistor 43 to conduct early during each half-cycle. When the transistor 43 conducts, it discharges the capacitor 48 into the gate 46 of the rectifier SCR causing the latter to conduct early during each half-cycle, and to cause the fan motor FM to operate at its maximum speed.

When decreasing outdoor temperature causes the pressure within the coil 12 to decrease below that at which the expansion valve 16 would operate properly, the resulting decrease of the temperature of the refrigerant within the coil 12 will result in the resistance of the thermistor TH increasing, and in the junction of the latter with the resistor 50 supplying lower voltages through the diode D to the control electrode 52 of the transistor 43, causing the latter to conduct later during each half-cycle, and causing the silicon controlled rectifier SCR to conduct later during each half-cycle. This decreases the speed of the fan motor FM so that the condenser pressure can increase.

The operation of a solid-state circuit as a low ambient as described in the foregoing is not novel, being disclosed in the previously mentioned Patent No. 3,196,629. The present invention resides in using such a circuit with a heat pump, and disabling it when the heat pump is operated for heating as will be described in the following.

*Heating operation of FIGS. 1–5*

The dashed-line arrows alongside the tubing of FIG. 1 show the direction of refrigerant flow during heating operation of the heat pump. When the heating control thermostat HT calls for heating, it closes its switches HTS1 and HTS2. The closed switch HTS1 energizes the compressor and fan motor starters CMS and FMS respectively. The closed switch HTS2 energizes the relay R which opens its switch RS1, and closes its switches RS2 and RS3. The now open switch RS1 disconnects the rectifier bridge B from the supply line L2. The now closed switch RS2 connects the stator winding 30 of the fan motor FM to the supply line L2. The now energized fan motor starter FMS closes its switch FMSS, connecting the stator winding 30 to the supply line L1. The stator winding 30 is now connected to both supply lines L1 and L2 so that the fan motor FM operates at full speed. The now energized compressor motor starter CMS closes its switch CMSS, energizing the compressor motor CM. The now closed switch RS3 energizes the reversal valve solenoid RVS which adjusts the reversal valve RV to its heating position.

The compressor C supplies discharge gas through the tube 10, the reversal valve RV, and the tube 22 into the indoor coil 21 operating as a condenser coil. Refrigerant liquid flows from the coil 21 through the tubes 20 and 14, the check-valve 19, the expansion valve 15, and the tube 13 into the outdoor coil 12 operating as an evaporator coil. Gas flows from the coil 12 through the tube 11, the reversal valve RV, and the tube 23 to the suction side of the compressor C.

The fan motor FM through being connected across the supply lines L1 and L2, operates at its maximum speed during heating operation regardless of changes in temperature of the outdoor coil 12.

*Description of FIG. 6*

FIG. 6 is similar to FIG. 5 except that there is added a fixed resistor 60 connected to the wire 39, and connected in series with an adjustable resistor 61 to the wire 40; except the switch RS1 instead of connecting the junction of the diodes 32 and 34 to the supply line L2, connects the junction of the thermistor TH and the resistor 50 to the diode D; except that the junction of the diodes 32 and 34 is connected directly to the supply line L2, and except that the switch RS2 instead of connecting, when closed, the stator winding 30 to the line L2, connects, when closed, the junction of the resistors 60 and 61 the diode D.

*Operation of FIG. 6*

FIG. 6 operates exactly as does FIG. 5 during cooling operation of the heat pump since the switch RS1 is closed and connects the junction of the thermistor TH and the resistor 50 to the diode D, and since the switch RS2 is open and disconnects the junction of the resistors 60 and 61 from the diode D.

During heating operation of the heat pump, the switch RS1 is opened, and the switch RS2 is closed when the relay R is energized by the closing of the switch HTS2 of the heating control thermostat HT. The open switch RS1 disconnects the junction of the thermistor TH and the resistor 50 from the diode D. The closed switch RS2 connects the junction of the resistors 60 and 61 to the diode D. The resistors 60 and 61 have such resistance that their junction provides through the switch RS2 and the diode D to the control electrode 52 of the transistor 43, and the capacitor 48, sufficient DC positive voltage to cause the transistor 43 and the silicon controlled rectifier SCR to conduct sufficiently early during half-cycles to cause the motor FM to operate at its maximum speed.

The fan motor FM when connects as shown by FIG. 5, across the lines L1 and L2 during heating operation of the heat pump, may operate slightly faster than when connected to the solid-state circuit during heating operation of the heat pump as shown in FIG. 6, but this is of no consequence.

What is claimed is:

1. A heat pump comprising a refrigerant compressor, refrigerant reversal means, an outdoor heat exchange coil, refrigerant expansion means, and an indoor heat exchange coil connected in a refrigerant circuit; said reversal means in its cooling position connecting said outdoor coil to the discharge side of said compressor, and indoor coil to the suction side of said compressor, said reversal means in its heating position connecting said indoor coil to said discharge side of said compressor, and said outdoor coil to said suction side of said compressor; means for adjusting said reversal means from said cooling position to said heating position, and vice versa; a fan for moving outdoor air over the surface of said outdoor coil; an electric motor for driving said fan; mans operable when said reversal means is in said cooling position for energizing said motor to operate said motor at its maximum speed when the temperature of said outdoor coil is sufficiently high that the pressure of the refrigerant flowing from said outdoor coil to said expansion means is sufficient to properly operate said exansion means, and for reducing the speed of said motor when the temperature of said outdoor coil is so reduced that the pressure of the refrigerant flowing from said outdoor coil to said expansion means is insufficient to properly operate said expansion means; and means operable when said reversal means is in said heating position for energizing said motor to operate at its maximum speed throughout the heating operation of said heat pump.

2. A heat pump as claimed in claim 1 in which said means operable when said reversal means is in said cooling position, comprises means responsive to changes in the temperature of said outdoor coil.

3. A heat pump as claimed in claim 2 in which said means operable when said reversal means is in said cooling position, comprises AC supply connections, rectifier means, a solid-state switch having a gate, means connecting said motor, said rectifier means and said switch in series to said connections, in which a control circuit including said means responsive to changes in the temperature of said outdoor coil is connected to said gate for causing said switch to conduct early during half-cycles on an increase in the temperature of said outdoor coil, and for causing said switch to conduct late during half-cycles on a decrease in the temperature of said outdoor coil.

4. A heat pump as claimed in claim 3 in which said means operable when said reversal means is in said heating position, comprises means for disconnecting said motor from said switch and said rectifier means, and comprises means for connecting said motor directly to said connections.

5. A heat pump as claimed in claim 3 in which said means responsive to changes in the temperature of said outdoor coil comprises a thermistor, and in which said means operable when said reversal means is in said heating position, comprises a resistor, comprises means for disconnecting said thermistor from said control circuit, and comprises means for connecting said resistor in said control circuit to replace said thermistor.

6. A heat pump comprising a refrigerant compressor, a refrigerant reversal valve, an outdoor heat exchange coil, refrigerant expansion means, and an indoor heat exchange coil connected in a refrigeration circuit; said reversal valve in its cooling position connecting said outdoor coil to the discharge side of said compressor, and said indoor coil to the suction side of said compressor, said reversal valve in its heating position connecting said indoor coil to said discharge side of said compressor, and said outdoor coil to said suction side of said compressor; a solenoid for placing, when deenergized, said reversal valve in said cooling position, and when energized, placing said reversal valve in said heating position; a fan for moving outdoor air over the surface of said outdoor coil; an electric motor for driving said fan; a heating control thermostat having a switch that is closed when said thermostat calls for heat; a relay having a first switch that is closed when said relay is deenergized, and is open when said relay is energized; said relay having second and third switches that are open when said relay is deenergized, and that are closed when said relay is energized; means including said switch of said thermostat for energizing said relay when said thermostat calls for heat; control means responsive to changes in the temperature of said outdoor coil; means including said third switch, when closed, for energizing said solenoid; means including said control means and including said first switch, when closed, for energizing said motor to operate at its maximum speed when the temperature of said outdoor coil is sufficiently high that the refrigerant flowing from it to said expansion means has sufficient pressure to properly operate said expansion means, and for decreasing the speed of said motor when the temperature of said outdoor coil is so reduced that the pressure of the refrigerant flowing from it to said expansion means is insufficient to properly operate said expansion means; and means including said second switch, when closed, for energizing said motor to operate at its maximum speed while said thermostat is calling for heat.

7. A heat pump as claimed in claim 6 in which said control means is a resistor, the resistance of which varies with the temperature of said outdoor coil, in which said means including said control means and said first switch comprises AC supply connections, rectifier means, a solid-state switch having a gate, means connecting said motor, said solid-state switch, said rectifier means and said first switch in series to said connections, means connecting said control means to said gate for causing said solid-state switch to conduct early during half-cycles on an increase in the temperature of said outdoor coil, and to conduct later during half-cycles on a decrease in the temperature of said outdoor coil.

8. A heat pump as claimed in claim 7 in which said first switch, when open, disconnects said rectifier means and said solid-state switch from said connections, and in which said second switch, when closed, connects said motor directly to said connections.

9. A heat pump as claimed in claim 7 in which a fixed resistor is provided, in which said means connecting said control means to said gate includes said first switch, and in which means including said second switch is provided for connecting said fixed resistor to said gate.

References Cited

UNITED STATES PATENTS

| | | | |
|---|---|---|---|
| 2,241,070 | 5/1941 | McLenegan | 62—160 |
| 3,230,728 | 1/1966 | Biehn | 62—160 |
| 3,264,839 | 8/1966 | Harnish | 62—160 |
| 3,307,368 | 3/1967 | Harnish | 62—160 |

WILLIAM J. WYE, *Primary Examiner.*